UNITED STATES PATENT OFFICE.

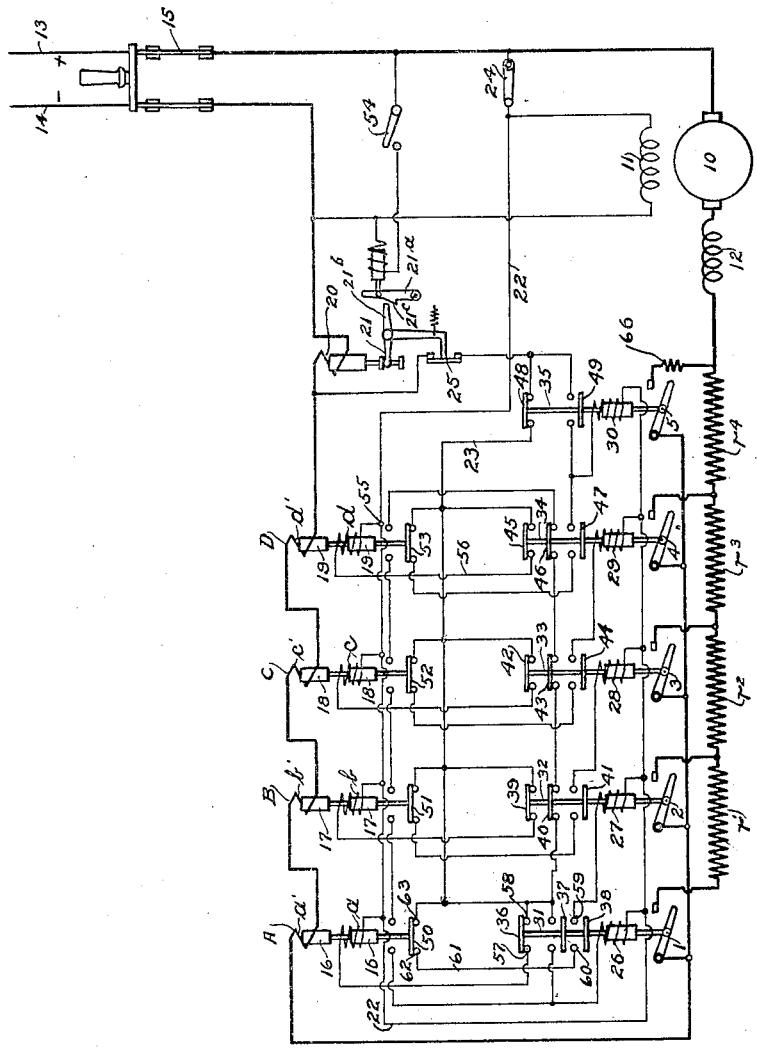

HALFDAN A. STEEN, OF MILWAUKEE, WISCONSIN, ASSIGNOR TO ALLIS-CHALMERS COMPANY, A CORPORATION OF NEW JERSEY.

MOTOR-CONTROL SYSTEM.

1,030,548.  Specification of Letters Patent.  Patented June 25, 1912.

Application filed September 6, 1910. Serial No. 580,534.

*To all whom it may concern:*

Be it known that I, HALFDAN A. STEEN, a subject of the King of Norway, residing at Milwaukee, in the county of Milwaukee and State of Wisconsin, have invented certain new and useful Improvements in Motor-Control Systems, of which the following is a full, clear, and exact specification.

This invention relates to a system of control employing a controller of the separately actuated contact type in which the several controller contacts are arranged to be operated at a rate dependent upon the value of the current in the motor circuit by means of connections so arranged that the system will be automatic.

The object of the invention is to provide novel means in connection with my controller to prevent a too rapid successive operation of the controlling contacts thereof.

The various novel features of my invention will be described in the specification and particularly set forth in the appended claims.

The invention is illustrated diagrammatically in the accompanying drawings.

The motor 10, here shown as having a shunt field 11 and series field 12 is connected to mains 13 and 14 by a switch 15. In order to vary the speed of the motor, sections $r'$, $r^2$, $r^3$, and $r^4$ of resistance are connected in series with the motor. These sections of resistance are cut in and out of circuit by automatically operated switches 1, 2, 3, 4, and 5 which are controlled respectively by adjacent contacts. The switches are further controlled by the action of current responsive devices or relays A, B, C, and D respectively. These relays are provided with shunt coils $a$, $b$, $c$, and $d$ respectively and also series coils $a'$, $b'$, $c'$, and $d'$ respectively, The shunt coils are employed for drawing up the cores 16, 17, 18, and 19 which control contact connections to be made preparatory to permitting current to flow through the motor. The series coils $a'$ $b'$ $c'$ and $d'$ are employed to hold up the cores 16, 17, 18, and 19 until the current in the motor circuit has decreased to a predetermined value whereupon the cores successively drop and connections are made for cutting out sections of resistance.

Located in the circuit of the motor with the sections $r'$, $r^2$, $r^3$, $r^4$ of resistance and series coils $a'$, $b'$, $c'$, and $d'$ of the relays, is the coil 20 of an overload relay 21 which is placed in circuit to prevent damage to the controller when an overload on the line occurs. A reset trip $21^a$ has been provided for the relay and it may be actuated by closing a switch 54. Upon the occurrence of an overload the current in coil 20 raises the core of the relay 21 causing the lever $21^b$ to be latched under the shoulder $21^c$ of the trip $21^a$ and opening the main energizing circuit. To return the parts of the overload relay to their normal positions, the switch 54 is closed, causing the energized reset coil to draw the core and latch of the reset trip $21^a$ away from the lever $21^b$. The shunt actuating coils $a$, $b$, $c$, $d$, are connected to the plus side of the line by a single conductor 22 and connected to the minus side of the line through another conductor 23. This circuit including shunt actuating coils and conductors 22 and 23 may be made and broken by a one-point master controller 24, a switch 25 of the overload relay and a plurality of contact members to be considered hereafter.

The switches 1 2, 3, 4, and 5 are operated by solenoids having coils 26, 27, 28, 29, and 30 respectively, which are located in the actuating circuits. The cores of these solenoids are connected respectively to rods 31, 32, 33, 34, and 35 upon which are mounted bridging contacts 36 to 49 inclusively which control, make and break circuit connections of the controller for the successful operation of the motor. The relays A, B, C, and D are also provided with bridging contact members 50 to 53 inclusive for making and breaking circuit connections.

Having thus briefly outlined the invention, the operation of the system will be considered: The main line switch 15 is closed first. As soon as the one point master controller 24 is closed a current is sent through conductor 22 through the shunt actuating coils $a$, $b$, $c$, and $d$, back through conductor 23, and relay switch 25 to the minus side of the line. Tracing this circuit more specifically and considering in particular the relay D, current passes through conductor 22, branches at the point 55 passing through the shunt actuating coil $d$, conductor 56, bridging contact 45, conductor 23, bridging contact 48, relay switch 25 to the minus side of the line. Each of the shunt actuating coils has connections similar to the one just described and may be traced readily. At the instant that the master controller 24 is closed all of the shunt actuating coils $a, b, c, d$, are energized, thus drawing up all of the cores 16, 17, 18, and 19. At the same time current passes through the coil 26 of the solenoid of switch #1, closing said switch, thus completing the motor circuit through all of the sections of resistance. It is absolutely necessary that all of the cores 16, 17, 18, and 19 of the relays be drawn up in order that switch #1 may close to permit a flow of current through the motor. When switch #1 is closed, rod 31 is forced up breaking the connection of bridging contact 36 with its corresponding stationary contacts 57 and 58, thus breaking the shunt actuating circuit of relay A. But due to the motor current which is passing through the series coil $a'$ of the relay A the core 16 is held up until the current in the motor circuit falls to a predetermined value. When the current has reached this predetermined value the core 16 drops and the bridging contact 50 completes a circuit from conductor 22, through coil 27, bridging contact 38 which is now connected with its corresponding stationary contact 59 and 60, through conductor 61, and bridging contact 50, which is now in engagement with its stationary contacts 62 and 63, to the minus side of the line. As just stated current at this time passes through the energizing coil 27 of switch #2 and the latter is closed cutting out the first section $r'$ of the resistance, thus permitting the motor to accelerate. When the current of the motor has again fallen to a predetermined value the core 17 of the relay B will fall completing connections so that switch #3 will be closed, thus cutting out the second section $r^2$ of the resistance permitting the motor to accelerate still more. In turn the cores 18 of relay C and 19 of relay D will drop making connections so that sections $r^3$ and $r^4$ of the resistance will be cut out of the motor circuit thus connecting the motor 10 directly to the mains through the last switch #5 and coil 20 of overload relay 21. At this point all of the relays A, B, C, and D are down or in their initial open position, and when the main line circuit is broken all of the switches 1, 2, 3, 4, and 5 will open and the motor may again be started by going through the same series of steps. Switch #5 is preferably of greater current carrying capacity than the other switches because it has to carry the full load current. This switch is provided with a blow-out magnet 66 to prevent any serious arcing.

By using a relay such as here disclosed having a shunt lifting coil and a series holding coil the latter of which is responsive to predetermined electrical conditions of the motor circuit, a time element is introduced into the system so that a steady step by step acceleration is accomplished. In this arrangement we have provided a motor controller of the separately actuated contact type having an actuating circuit for each contact controlled by an adjacent contact, and a switch in said circuit controlled by a relay having a lifting coil and a holding coil in the motor circuit.

There may be arrangements whereby a fewer number of relays may be used, there may be also other modifications of the precise arrangement herein shown and described, and I aim in my claims to cover all such modifications which do not involve a departure from the spirit and scope of my invention.

What I claim as new is:

1. In a controller, a series of switches arranged to close in automatic progression, a separate relay for each switch for controlling the operation of a succeeding switch, each of said relays having a plurality of windings for controlling the operations of said relays, and means associated with each switch coöperating with each relay for controlling the operation of the succeeding switch, none of said switches being operative until all of said relays have been operated.

2. In a controller, a series of switches arranged to close in automatic progression, a relay having a shunt lifting coil and a series holding coil in the motor circuit and associated with each switch for controlling the operation of a succeeding switch, and means associated with each switch coöperating with its corresponding relay for controlling the operation of the succeeding switch, none of said switches being operative until all of said relays have been operated.

3. In a controller, a series of switches arranged to close in automatic progression, and a relay having a shunt coil and a series coil and associated with each switch for controlling the operation of a succeeding switch, none of said switches being operative until a plurality of said relays have been operated.

4. In a controller, a series of switches arranged to close in automatic progression, and a double coiled relay associated with each switch for controlling the operation of a succeeding switch, none of said switches being operated until a plurality of said relays have been operated.

5. In a controller adapted to start a motor, a series of switches arranged to close in automatic progression, and a current responsive device having a shunt lifting coil and a series holding coil and associated with each switch for controlling the operation of another switch, the motor being inoperative until a plurality of current responsive devices have been operated.

6. In a controller, a series of switches arranged to close in automatic progression, and a relay having a plurality of windings and associated with each switch for controlling the operation of a succeeding switch, one of said relay windings being adapted to control the operation of said relay in one direction and another of said relay windings being adapted to control the operation of said relay in another direction, none of said switches being operative until all of said current responsive devices have been operated.

7. In a motor controller of the separately actuated contact type, a plurality of relays having shunt and series coils, sections of resistance adapted to be cut out of circuit by the operation of said relays, and a plurality of switches controlled by current in the series coils for cutting out successively said sections of resistance, said switches being inoperative until all of said relays have been closed due to current in said shunt coils.

8. In a motor controller of the separately actuated contact type, a plurality of relays having shunt lifting and series holding coils, all of said relays being operable simultaneously upon the admission of current in said shunt coils, sections of resistance adapted to be cut out of circuit by the operation of said relays, and a plurality of switches controlled by current in said series coils for cutting out successively said sections of resistance, none of said switches being operative until all of said relays have been closed.

In testimony whereof I affix my signature, in the presence of two witnesses.

HALFDAN A. STEEN.

Witnesses:
CHAS. L. BYRON,
JOHN L. JOHNSON.